United States Patent
Ueno

(10) Patent No.: US 9,138,848 B2
(45) Date of Patent: Sep. 22, 2015

(54) METHOD AND APPARATUS FOR SUPPRESSING VIBRATION

(75) Inventor: Hiroshi Ueno, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 602 days.

(21) Appl. No.: 13/268,242

(22) Filed: Oct. 7, 2011

(65) Prior Publication Data

US 2012/0101624 A1    Apr. 26, 2012

(30) Foreign Application Priority Data

Oct. 25, 2010 (JP) ................................. 2010-238893

(51) Int. Cl.
G06F 19/00 (2011.01)
B23Q 17/09 (2006.01)
G05B 19/404 (2006.01)

(52) U.S. Cl.
CPC .......... *B23Q 17/0976* (2013.01); *G05B 19/404* (2013.01); *G05B 2219/37435* (2013.01); *G05B 2219/41115* (2013.01); *G05B 2219/41256* (2013.01)

(58) Field of Classification Search
CPC ........... G05B 2219/37435; G05B 2219/41115; G05B 2219/41256; G05B 19/404; B23Q 17/0976
USPC .......... 700/159, 173, 174, 177; 409/131, 141; 702/33, 56
See application file for complete search history.

(56) References Cited

U.S. PATENT DOCUMENTS 3,744,353 A * 7/1973 Rohs ................................ 82/118
5,930,530 A * 7/1999 Hirano et al. .................... 396/53
2006/0018725 A1 * 1/2006 Ichino et al. ................... 409/131
2009/0069927 A1 * 3/2009 Suzuki et al. ................... 700/177
2010/0010662 A1 * 1/2010 Inagaki .......................... 700/175

FOREIGN PATENT DOCUMENTS

CN       101623835 A      1/2010
JP       49-105277        10/1974
JP       2003-340627 A1   12/2003

OTHER PUBLICATIONS

Workshop Material and Papers, a2001-JSME (Japan Society of Mechanical Engineers), "Basic Knowledge of Cutting Works and Chatter Vibration," pp. 11-22.
Tadashi Takemura, et al., "Analysis of Parameters Affecting Chatter Suppression," J. Japan Soc. of Precis. Eng., vol. 42, No. 503, 1976, pp. 1049-1055.
Chinese Office Action (With English Translation), Chinese Application No. 201110325458.0, dated Dec. 31, 2014 (8 pages).

* cited by examiner

*Primary Examiner* — Kenneth M Lo
*Assistant Examiner* — Chad Rapp
(74) *Attorney, Agent, or Firm* — Burr & Brown, PLLC

(57) ABSTRACT

A vibration suppressing method and a vibration suppressing device are disclosed. After detection of chatter vibration using at least one vibration detecting device, a stable rotation speed for suppressing the chatter vibration is calculated using a stable rotation speed calculating device. A determination device then compares a detection value detected by the vibration detecting device, a predetermined setting value, and/or a current value that is calculated based on at least one of the detection value and the setting value, to a predetermined determination reference value that is previously set. Thereafter, the determination device determines whether or not the stable rotation speed is adopted in accordance with the comparison result, and changes rotation speed of the rotary shaft to the stable rotation speed if the stable rotation speed is adopted.

20 Claims, 7 Drawing Sheets

METHOD AND APPARATUS FOR SUPPRESSING VIBRATION

BACKGROUND OF THE INVENTION

This application claims the entire benefit of Japanese Patent Application Number 2010-238893 filed on Oct. 25, 2010, the entirety of which is incorporated by reference.

FIELD OF THE INVENTION

The present invention relates to a vibration suppressing method and a vibration suppressing apparatus for a machine tool which is provided with a rotary shaft for rotating a tool or a workpiece to process the workpiece, and more particularly to a vibration suppressing method and a vibration suppressing apparatus for suppressing chatter vibration generated during processing of the workpiece.

BACKGROUND ART

Conventionally, as a vibration suppressing method for a machine tool provided with a rotary shaft for rotating a tool or a workpiece to process the workpiece, a method disclosed in Japanese Laid-open Patent Application Publication No. 2003-340627 is known. According to this vibration suppressing method, in order to suppress regenerative type chatter vibration which may cause deterioration of accuracy in finishing the processing surface and breakage of the tool, the natural frequency of a chatter vibration-generating system, such as the tool and the workpiece, is obtained. Then the obtained natural frequency is increased 60 times and divided by the number of tool flutes and a predetermined integer to obtain a value which is a stable rotation speed. The rotation of the rotary shaft is controlled by the stable rotation speed.

In the meantime, it is known that a stable limit chart in FIG. 4 indicates characteristics of the above regenerative type chatter vibration as shown in non patent literature "Workshop material and papers, a2001-JSME (Japan Society of Mechanical Engineers), Basic knowledge of cutting works and chatter vibration". The stable limit chart indicates the relationship between rotation speed of the rotary shaft and limit depth of cut under which chatter vibration does not occur. In the region above the wave-like stable limit boundary (i.e., in a region where the depth of cut becomes greater), chatter vibration will not occur. Therefore, the vibration suppressing method as disclosed in Japanese Laid-open Patent Application Publication No. 2003-340627 substantially corresponds to calculating the rotation speed at which the limit depth of cut takes the maximum value in the stable limit chart. In view of this, the above mentioned vibration suppressing method disclosed is effective in a region where the difference between the maximum value and the minimum value of the limit depth of cut becomes greater, namely, in a region where the rotary shaft rotates at high speed. On the other hand, it is not so effective in a region where the difference between the maximum value and the minimum value of the limit depth of cut becomes smaller, namely, in a region where the rotary shaft rotates at low speeds.

Further, Japanese Laid-open Patent Application Publication No. 49-105277 discloses a technique for suppressing regenerative type chatter vibration by fluctuating the rotation speed of the rotary shaft using predetermined amplitude and period based on a predetermined average rotation speed. It is known that, according to this technique, regenerative type chatter vibration can be suppressed more effectively as the rotary speed becomes lower as shown in non-patent literature such as "Analysis of parameters affecting chatter suppression, J. Jpn. Soc. Precis. Eng., Vol. 42, 11".

SUMMARY OF THE INVENTION

As described previously, a different method is used for effectively suppressing regenerative type chatter vibration depending on whether the rotation speed of the rotary shaft falls in a high speed region or a low speed region. However, various factors such as processing conditions (e.g., depth of cut) and natural frequency of the rotary shaft system affect the rotation speed around the boundary distinguishing between the high speed region and the low speed region. For this reason, when regenerative type chatter vibration generates during the actual processing, it is difficult for the worker to determine whether the current rotation speed of the rotary shaft falls in the high speed region or in the low speed region, and consequently, the worker may disadvantageously select a vibration suppressing method which is not as effective as the other method.

In view of the above, the present invention seeks to provide a method and an apparatus for suppressing vibration, which can reliably select a suppressing method for effectively suppressing chatter vibration, namely, which does not continuously adopt an ineffective suppressing method.

In order to achieve the above object, according to a first aspect of the present invention, there is provided a method for suppressing chatter vibration of a machine tool provided with a rotary shaft for rotating a tool or a workpiece during the rotation of the rotary shaft, the method comprising the steps of a first step of detecting chatter vibration using at least one vibration detecting device, a second step of calculating a stable rotation speed for suppressing the chatter vibration using a stable rotation speed calculating device after detection of the chatter vibration, and a third step of comparing a detection value detected by the vibration detecting device, a predetermined setting value, and/or a current value that is calculated based on the at least one of the detection value and the setting value, to a predetermined determination reference value that is previously set, determining whether or not the stable rotation speed is adopted in accordance with the comparison result, and changing rotation speed of the rotary shaft to the stable rotation speed if the stable rotation speed is adopted, the third step being executed by a determination device.

In a first specific embodiment of the above method according to the first aspect of the present invention, if the stable rotation speed is not adopted in the third step, a display device may indicate that chatter vibration has occurred.

In order to achieve the above object, according to a second aspect of the present invention, there is provided a method for suppressing chatter vibration of a machine tool provided with a rotary shaft for rotating a tool or a workpiece during the rotation of the rotary shaft, the method comprising the steps of a first step of detecting chatter vibration using at least one vibration detecting device, a second step of creating a command for fluctuating rotation speed of the rotary shaft after detection of the chatter vibration using a speed variation controlling device, based on variation parameters including a reference rotation speed that is input or previously set, amplitude and period; and a third step of comparing a detection value detected by the vibration detecting device, a predetermined setting value, and/or a current value that is calculated based on at least one of the detection value and the setting value, to a predetermined determination reference value that is previously set, determining whether or not the command is adopted in accordance with the comparison result, and fluctuating rotation speed of the rotary shaft based on the command if the command is adopted, the third step being executed by a determination device.

In a first specific embodiment of the above method according to the second aspect of the present invention, the third step may further comprise determining as to whether or not the command is executable on the rotary shaft irrespective of whether the command is adopted, and adopting the command and fluctuating the rotation speed of the rotary shaft based on the command if the command is executable.

In a second specific embodiment according to the second aspect of the present invention or the first specific embodiment of the second aspect of the present invention, when the rotation speed of the rotary shaft is not fluctuating based on the command in the third step, a display device may indicate that chatter vibration has occurred.

In order to achieve the above object, according to a third aspect of the present invention, there is provided a method for suppressing chatter vibration of a machine tool provided with a rotary shaft for rotating a tool or a workpiece during the rotation of the rotary shaft, the method comprising the steps of a first step of detecting chatter vibration using at least one vibration detecting device, a second step of calculating a stable rotation speed for suppressing the chatter vibration using a stable rotation speed calculating device after detection of the chatter vibration, and creating a command for fluctuating rotation speed of the rotary shaft using a speed variation controlling device based on variation parameters including a reference rotation speed that is input or previously set, amplitude and period, and a third step of comparing a detection value detected by the vibration detecting device, a predetermined setting value, and/or a current value that is calculated based on at least one of the detection value and the setting value, to a predetermined determination reference value that is previously set, determining whether or not the stable rotation speed is adopted or the command is adopted in accordance with the comparison result, and controlling the rotation speed of the rotary shaft in accordance with the determination result, the third step being executed by a determination device.

In a first specific embodiment of the above method according to the third aspect of the present invention, the third step may further comprise determining as to whether or not the command is executable on the rotary shaft irrespective of whether the stable rotation speed is adopted or the command is adopted, and adopting the command and fluctuating the rotation speed of the rotary shaft based on the command if the command is executable.

In a second specific embodiment according to the third aspect of the present invention or the first specific embodiment of the third aspect of the present invention, if the command is not executable in the third step, a display device may indicate that chatter vibration has occurred.

In any one of the above first to third aspects of the present invention and their specific embodiments, the determination reference value may include at least one of a predetermined rotation speed, chatter frequency of chatter vibration, a pitch between local maximum values in a stable limit chart, the number of vibration marks left on a cutting surface due to chatter vibration, difference between current rotation speed and the stable rotation speed, and difference between current depth of cut and depth of cut at the stable rotation speed.

In order to achieve the above object, according to a fourth aspect of the present invention, there is provided an apparatus for suppressing chatter vibration of a machine tool provided with a rotary shaft for rotating a tool or a workpiece during the rotation of the rotary shaft, the vibration suppressing apparatus comprising at least one vibration detecting device each configured to detect chatter vibration, a stable rotation speed calculating device configured to calculate a stable rotation speed for suppressing the chatter vibration after detection of the chatter vibration; and a determination device configured to compare a detection value detected by the vibration detecting device, a predetermined setting value, and/or a current value that is calculated based on at least one of the detection value and the setting value, to a predetermined determination reference value that is previously set, to determine whether or not the stable rotation speed is adopted in accordance with the comparison result, and to change rotation speed of the rotary shaft to the stable rotation speed if the stable rotation speed is adopted.

In order to achieve the above object, according to a fifth aspect of the present invention, there is provided an apparatus for suppressing chatter vibration of a machine tool provided with a rotary shaft for rotating a tool or a workpiece during the rotation of the rotary shaft, the vibration suppressing apparatus comprising at least one vibration detecting device each configured to detect chatter vibration, a speed variation controlling device configured to create a command for fluctuating rotation speed of the rotary shaft after detection of the chatter vibration, based on variation parameters including a reference rotation speed that is input or previously set, amplitude and period; and a determination device configured to compare a detection value detected by the vibration detecting device, a predetermined setting value, and/or a current value that is calculated based on at least one of the detection value and the setting value, to a predetermined determination reference value that is previously set, to determine whether or not the command is adopted in accordance with the comparison result, and to fluctuating rotation speed of the rotary shaft based on the command if the command is adopted.

In order to achieve the above object, according to a sixth aspect of the present invention, there is provided an apparatus for suppressing chatter vibration of a machine tool provided with a rotary shaft for rotating a tool or a workpiece during the rotation of the rotary shaft, the vibration suppressing apparatus comprising: at least one vibration detecting device each configured to detect chatter vibration; a stable rotation speed calculating device configured to calculate a stable rotation speed for suppressing the chatter vibration after detection of the chatter vibration; a speed variation controlling device configured to create a command for fluctuating rotation speed of the rotary shaft after detection of the chatter vibration, based on variation parameters including a reference rotation speed that is input or previously set, amplitude and period; and a determination device configured to compare a detection value detected by the vibration detecting device, a predetermined setting value, and/or a current value that is calculated based on at least one of the detection value and the setting value, to a predetermined determination reference value that is previously set, to determine whether or not the stable rotation speed is adopted or the command is adopted in accordance with the comparison result, and to control the rotation speed of the rotary shaft in accordance with the determination result.

In any one of the above fourth to sixth aspects of the present invention, the vibration suppressing apparatus may further comprise a display device configured to indicate that chatter vibration has occurred.

In order to achieve the above object, according to a seventh aspect of the present invention, there is provided a method for suppressing chatter vibration of a machine tool provided with a rotary shaft for rotating a tool or a workpiece during the rotation of the rotary shaft, the method comprising the steps of a first step of detecting chatter vibration using at least one vibration detecting device, a second step of calculating a stable rotation speed for suppressing the chatter vibration using a stable rotation speed calculating device after detection of the chatter vibration, and creating a command for fluctuating rotation speed of the rotary shaft using a speed variation controlling device based on variation parameters including a reference rotation speed that is input or previously set, amplitude and period; and a third step of selecting and executing one of a first control, by which the rotation speed of the rotary shaft is changed to the stable rotation speed, and a second control, by which the rotation speed of the rotary shaft is fluctuating based on the command, and thereafter executing the other one of the second control and the first control when chatter vibration is detected again in a predetermined period of time, the third step being executed by a determination device.

Further, in order to achieve the above object, according to an eighth aspect of the present invention, there is provided an apparatus for suppressing chatter vibration of a machine tool provided with a rotary shaft for rotating a tool or a workpiece during the rotation of the rotary shaft, the vibration suppressing apparatus comprising at least one vibration detecting device each configured to detect chatter vibration; a stable rotation speed calculating device configured to calculate a stable rotation speed for suppressing the chatter vibration after detection of the chatter vibration, a speed variation controlling device configured to create a command for fluctuating rotation speed of the rotary shaft after detection of the chatter vibration, based on variation parameters including a reference rotation speed that is input or previously set, amplitude and period, and a determination device configured to select and execute one of a first control, by which the rotation speed of the rotary shaft is changed to the stable rotation speed, and a second control, by which the rotation speed of the rotary shaft is fluctuated based on the command, and thereafter to execute the other one of the second control and the first control when chatter vibration is detected again in a predetermined period of time.

According to the present invention, effectiveness is determined for the control for changing the rotation speed of the rotary shaft to the stable rotation speed and/or the control for fluctuating the rotation speed based on the variation parameters including a reference rotation speed that is input or previously set, amplitude and period, and thereafter, an effective control is performed or an ineffective control is not continuously adopted. It is therefore possible to prevent the vibration suppression control that is ineffective against suppression of the chatter vibration from being continuously adopted.

Further, providing the display device makes it possible to reliably inform the worker of an occurrence of chatter vibration, so as to urge the worker to take countermeasures such as changing the depth of cut, or to reset the variation parameters.

BRIEF DESCRIPTION OF THE DRAWINGS

The above aspect, other advantages and further features of the present invention will become more apparent by describing in detail illustrative, non-limiting embodiments thereof with reference to the accompanying drawings.

DETAILED DESCRIPTION OF INVENTION

With reference to the accompanying drawings, a method and an apparatus for suppressing vibration according to exemplary embodiments of the present invention will be described in detail.

First Embodiment

Figure 1:
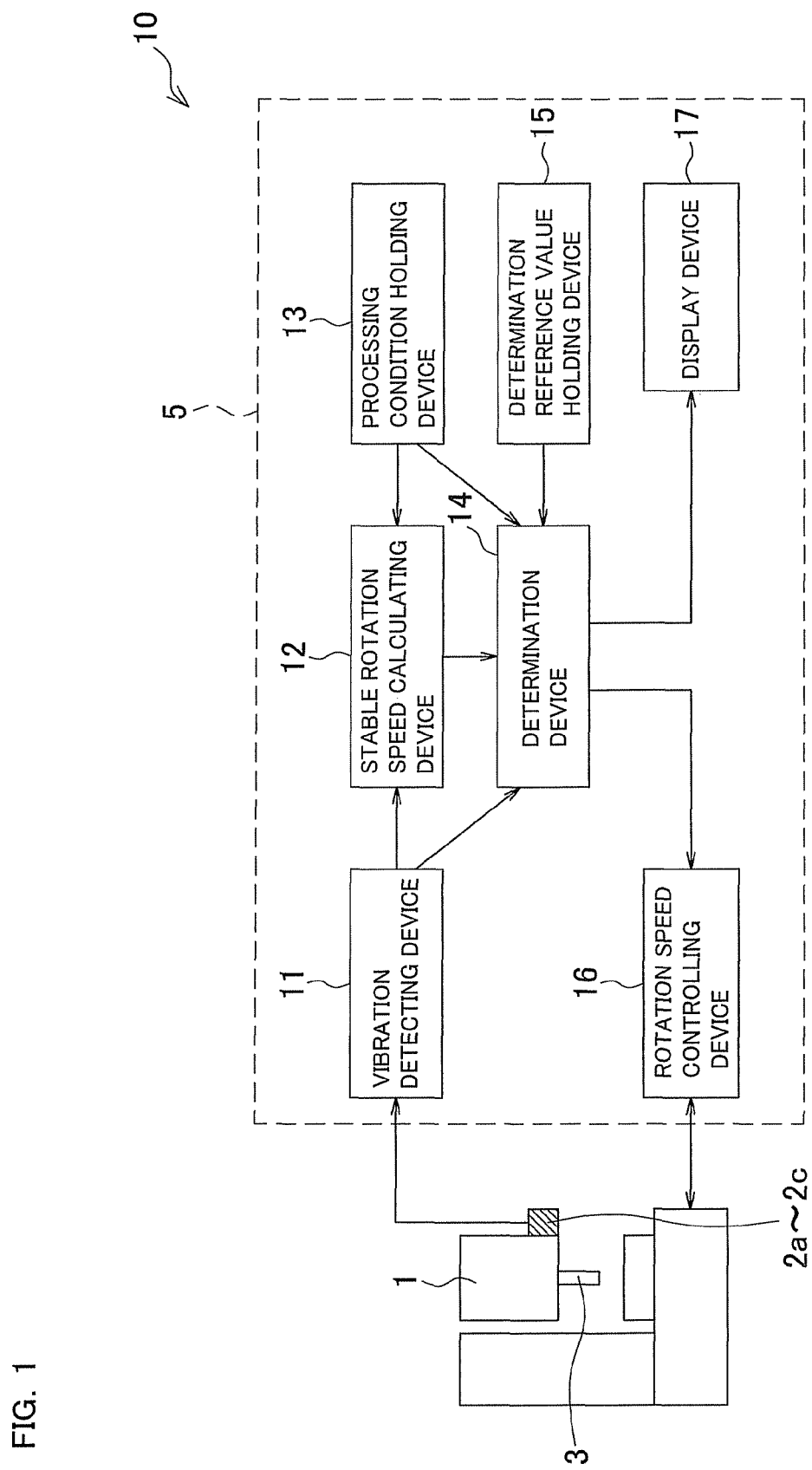
FIG. 1 is a block diagram of a vibration suppressing apparatus according to a first embodiment of the present invention.
Figure 2:
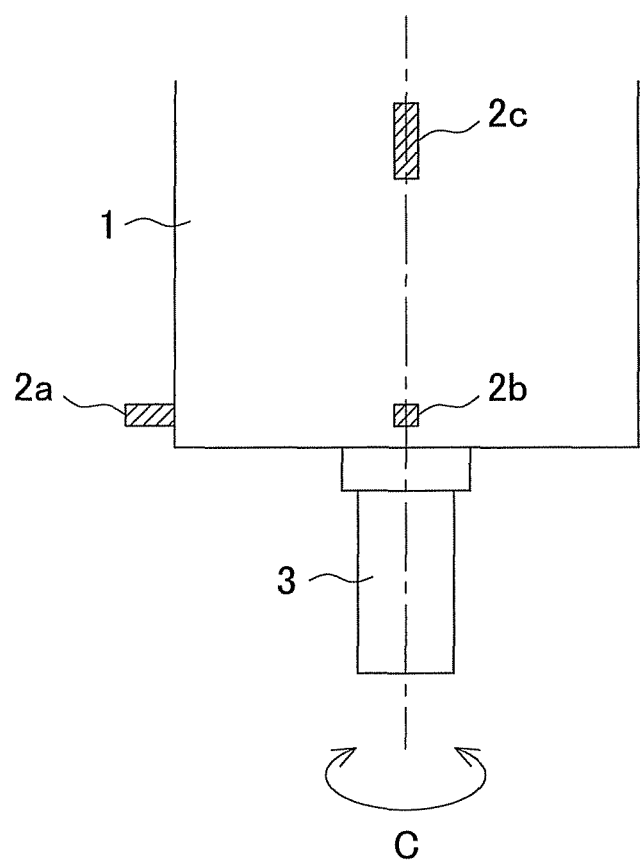
FIG. 2 is a side view of a rotary shaft housing.
Figure 3:
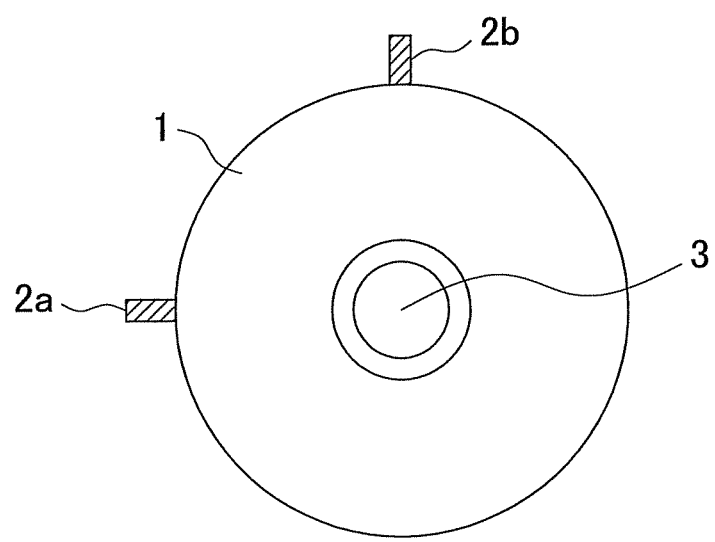
FIG. 3 is an explanatory view illustrating the rotary shaft housing 1 in a shaft direction.

FIG. 1 is an explanatory diagram illustrating a block configuration of a vibration suppressing apparatus 10 according to a first embodiment of the present invention. FIG. 2 is an explanatory view laterally illustrating a rotary shaft housing 1, which is subject to vibration suppression. FIG. 3 is an explanatory view illustrating the rotary shaft housing 1 in a shaft direction.

A vibration suppressing apparatus 10 is configured to suppress "chatter vibration" generated in a rotary shaft 3 which is rotatably provided around a C-axis of the rotary shaft housing 1. The vibration suppressing apparatus 10 includes vibration sensors $2a$-$2c$ for detecting time-domain vibrational accelerations (which means vibrational accelerations on a time axis) which are characteristic values derived from vibration generated at the rotating rotary shaft 3, and a controller 5 for analyzing the detection values of the vibration sensors $2a$-$2c$ to determine whether or not "chatter vibration" has occurred and based on the determination result controlling rotation speed of the rotary shaft 3.

As best seen in FIGS. 2 and 3, the vibration sensors $2a$-$2c$ are attached to the rotary shaft housing 1. One vibration sensor detects the time-domain vibrational acceleration in a direction orthogonal to the other vibration sensors (e.g., the vibration sensors $2a$-$2c$ are attached such that each sensor detects the time-domain vibrational acceleration respectively in X, Y, and Z directions which are orthogonal to one other.

The controller 5 includes a vibration detecting device 11, a stable rotation speed calculating device 12, a processing condition holding device 13, a determination device 14, a determination reference value holding device 15, a rotation speed controlling device 16, and a display device 17.

The vibration detecting device 11 is configured to carry out an analysis based on the time-domain vibrational accelerations detected by the vibration sensors $2a$-$2c$ to obtain frequency-domain vibrational accelerations (which means vibrational accelerations on a frequency axis) and to determine that "chatter vibration" occurs when the maximum value of the obtained frequency-domain vibrational acceleration is greater than a predetermined threshold value. The stable rotation speed calculating device 12 is configured to calculate a stable rotation speed for suppressing the chatter vibration upon detection of the chatter vibration. The processing condition holding device 13 is configured to hold various processing conditions such as the number of tool flutes Z and the depth of cut. The determination device 14 is configured to determine whether or not the calculated stable rotation speed is adopted, namely, to determine whether or not the stable rotation speed is effective for suppressing "chatter vibration". The determination reference value holding device 15 is configured to hold determination reference values required for determination by the determination device 14. The rotation speed controlling device 16 is configured to control rotation speed of the rotary shaft 3 in the rotary shaft housing 1. The display device 17 is configured to display a warning if the chatter vibration is not effectively suppressed by the calculated stable rotation speed. It is to be noted that processing conditions held in the determination reference value holding device 15 are previously input by a worker prior to processing.

An explanation will be given of vibration suppression control for "chatter vibration" using the vibration suppressing apparatus 10.

Figure 4:
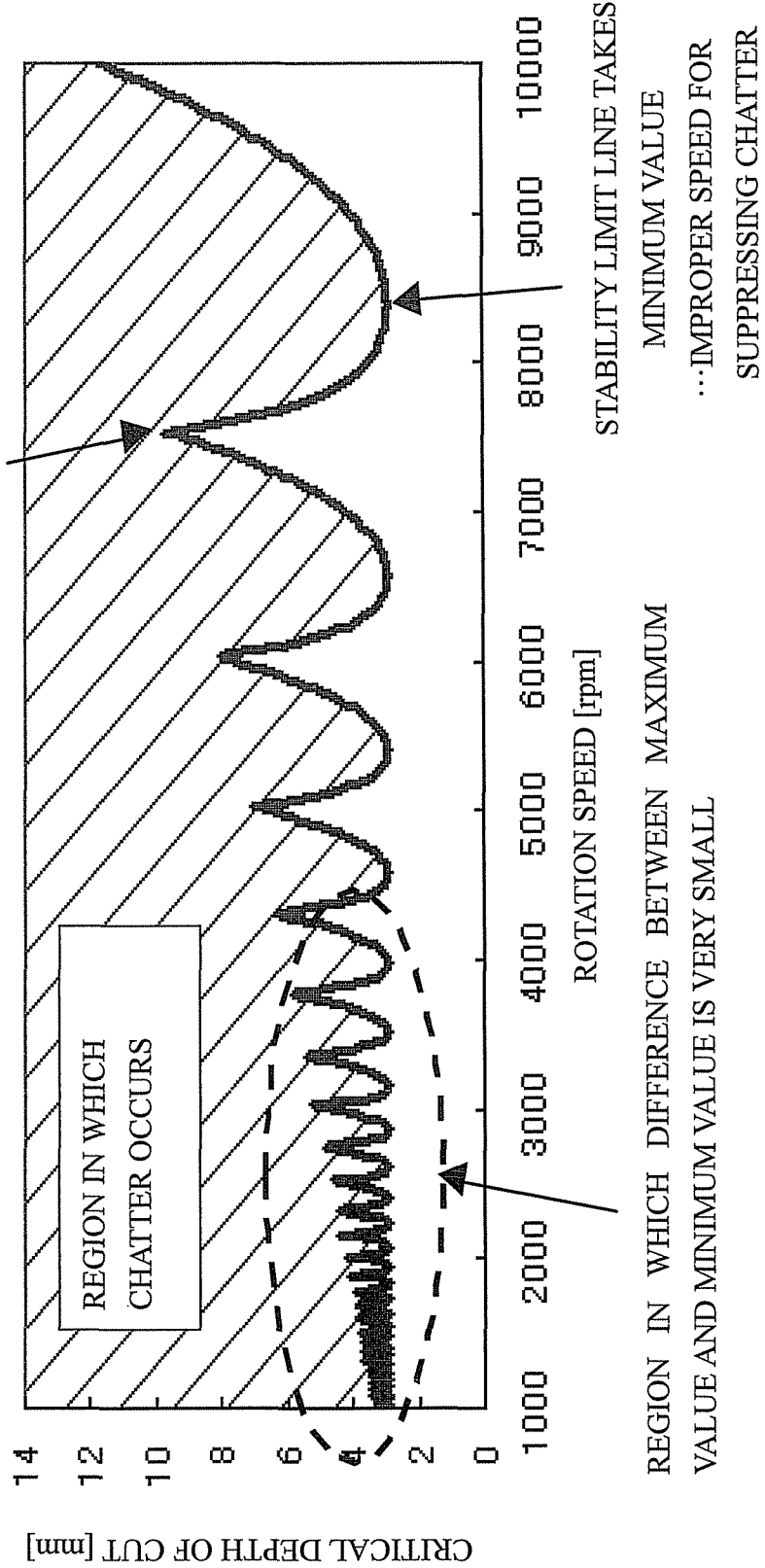
FIG. 4 is an explanatory diagram showing an example of a stable limit chart.
Figure 5:
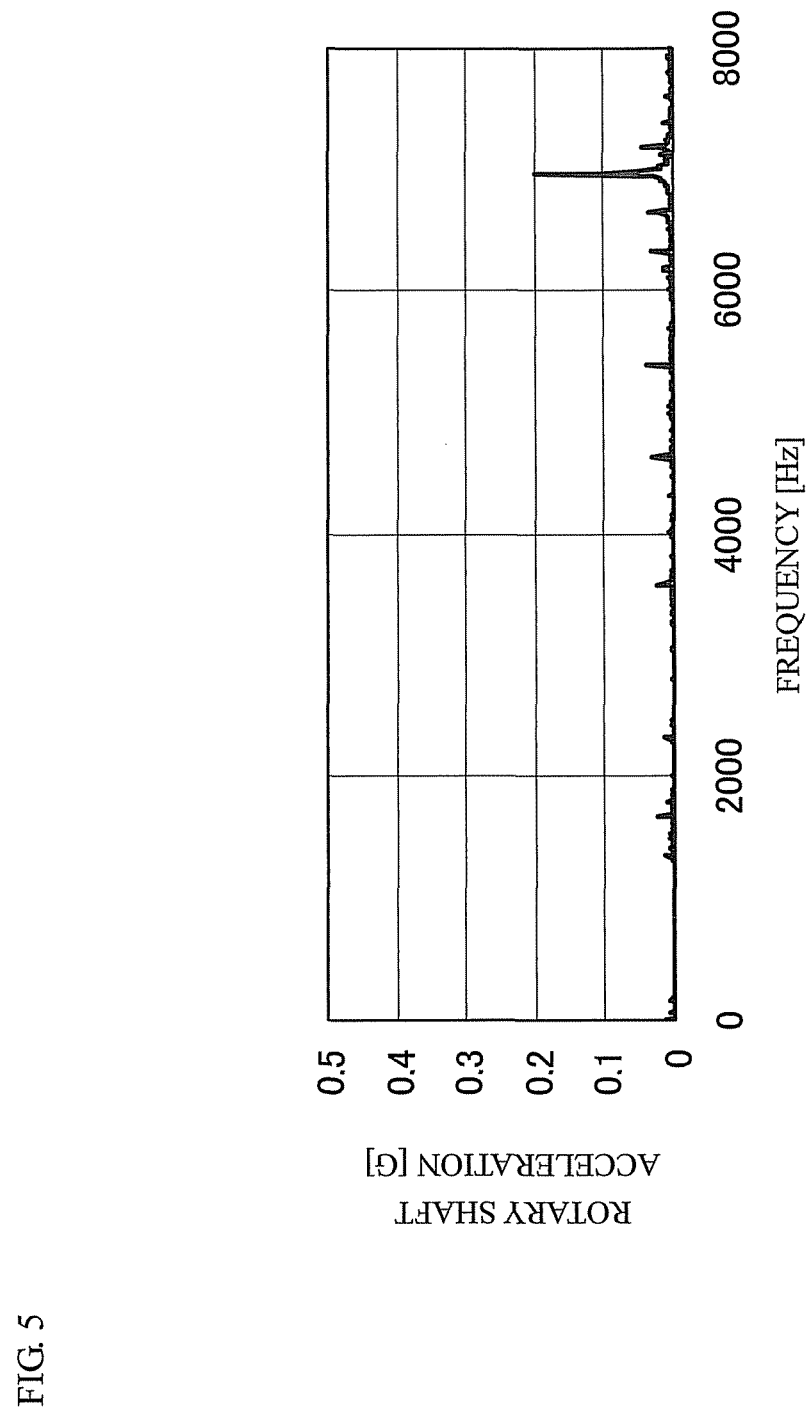
FIG. 5 is an explanatory diagram showing an example of a Fourier analysis result of time-domain vibrational accelerations.

A predetermined determination rotation speed as a determination reference value is held in the determination reference value holding device 15. The worker previously and arbitrarily determines the determination rotation speed; for example, when a stable limit chart such as shown in FIG. 4 is obtained, the worker may hold the value of 5,000 $\text{min}^{-1}$ as the determination rotation speed, at which value the difference between the maximum value and the minimum value of the limit depth of cut becomes sufficiently large. Thereafter, when the rotary shaft 3 rotates at a predetermined rotation speed and the processing is started under control of the controller 5, the vibration detecting device 11 carries out a Fourier analysis of the time-domain vibrational accelerations which are constantly detected by the vibration sensors 2a-2c during the rotation of the rotary shaft 3 to analyze the relationship between frequency of the rotary shaft 3 and frequency-domain vibrational acceleration of the rotary shaft 3 corresponding to the frequency as shown in FIG. 5. The vibration detecting device 11 also monitors whether or not the maximum value of the frequency-domain vibrational acceleration (i.e., vibration 6 in FIG. 5 which is also the maximum acceleration) exceeds the predetermined threshold value that is previously set so as to detect an occurrence of "chatter vibration." When the maximum value of the frequency-domain vibrational acceleration exceeds the predetermined threshold value, a determination is made that "chatter vibration" to be suppressed has occurred in the rotary shaft 3 and the stable rotation speed calculating device 12 calculates the stable rotation speed using an arithmetic expression disclosed in the above Patent Literature 1 and Non-patent Literature 1.

Next, the determination device 14 compares the stable rotation speed (i.e., current value) calculated by the stable rotation speed calculating device 12 to the determination rotation speed, and determines whether or not the stable rotation speed is equal to or greater than the determination rotation speed. When the stable rotation speed is equal to or greater than the determination rotation speed, it can be said that the stable rotation speed falls in a region where the difference between the maximum value and the minimum value of the limit depth of cut becomes large in the stable limit chart of FIG. 4 (i.e., right-hand side region of FIG. 4). This stable rotation speed is therefore adopted as the rotation speed by which the chatter vibration is effectively suppressed, and the rotation speed controlling device 16 changes the rotation speed of the rotary shaft 3 to the stable rotation speed. In the meantime, when the stable rotation speed is lower than the determination rotation speed, it can be said that the stable rotation speed falls in a region where the difference between the maximum value and the minimum value of the limit depth of cut becomes small in the stable limit chart of FIG. 4 (i.e., left-hand side region of FIG. 4). Namely, even if the rotation speed of the rotary shaft 3 is changed to this stable rotation speed, the chatter vibration cannot be suppressed effectively. Therefore, the determination device 14 does not adopt the stable rotation speed (i.e., the rotation speed is not changed), and the display device 17 informs that the chatter vibration has occurred so as to urge the worker to take countermeasures such as changing the depth of cut.

In the above vibration suppression control, the determination rotation speed is set for 5,000 $\text{min}^{-1}$ as one example. However, it should be understood that the determination rotation speed is not limited to this specific rotation speed.

Further, other than the determination rotation speed, various modifications may be adopted to the determination reference value. For example, attention may be focused on frequency which takes the maximum acceleration (i.e., chatter frequency). Namely, because a pitch between stable rotation speeds (i.e., pitch between maximum values in the stable limit chart) depends on natural frequency of the rotary shaft 3 system and thus chatter frequency, the pitch becomes closer as the chatter frequency increases (in the left-hand side region of the stable limit chart). For this reason, a predetermined chatter frequency may be held in advance in the determination reference value holding device 15 as a determination frequency (i.e., determination reference value). The determination device 14 may determine whether or not the chatter frequency (i.e., current value) detected by the vibration detecting device 11 is equal to or smaller than the determination frequency, and adopt the stable rotation speed calculated by the stable rotation speed calculating device 12 when the chatter frequency is equal to or smaller than the determination frequency, but may not adopt the stable rotation speed and instead a warning is displayed when the chatter frequency is greater than the determination frequency.

Further, a pitch ΔS of stable rotation speeds approximately calculated from the following Formulae (1) and (2) with reference to Non-patent Literature 1 may be adopted as the determination reference value.

[In the following Formulae (1) and (2), fc is chatter frequency (same as the above chattel frequency), and Z is the number of tool flutes. In Formula (1), k is the number of vibration marks left on a cutting surface due to "chatter vibration" and k is obtained from Formula (2). Further, floor ( ) in Formula (2) indicates the maximum integer not exceeding the numerical value filled in the parentheses, and Sc indicates rotation speed.

$$\Delta S = \frac{60 fc}{Z \cdot k(k+1)} \qquad \text{Formula (1)}$$

$$k = \text{floor}\left(\frac{60 fc}{Z \cdot Sc}\right) \qquad \text{Formula (2)}$$

In this modification, a predetermined pitch may be held in advance in the determination reference value holding device 15 as a determination pitch (i.e., determination reference value). The determination device 14 may calculate a pitch ΔS (i.e., current value) based on the chatter frequency detected by the vibration detecting device 11 and from the above Formulae (1) and (2), determine whether or not the calculated pitch ΔS is equal to or greater than the determination pitch, and adopt the stable rotation speed calculated by the stable rotation speed calculating device 12 if the calculated pitch ΔS is equal to or greater than the determination pitch. However, the determination device 14 may not adopt the stable rotation speed and instead a warning is displayed when the calculated pitch ΔS is less than the determination pitch.

According to the above formulae (1) and (2), the relationship between pitch ΔS and the number of vibration marks k is such that the pitch ΔS becomes smaller as the number of vibration marks k increases. For this reason, attention may be focused on the number of vibration marks k, and a predetermined number of vibration marks may be held in advance in the determination reference value holding device 15 as a determination number of vibration marks (i.e., determination reference value). The determination device 14 may compare the number of vibration marks k (i.e., current value) calculated from the detected chatter frequency and the like to the determination number of vibration marks, and determine whether or not the stable rotation speed calculated by the stable rotation speed calculating device 12 is adopted. To be more specific, the determination device 14 may adopt the stable rotation speed when the number of vibration marks k is equal to or smaller than the determination number of vibration marks, but may not adopt the stable rotation speed and instead a warning is displayed when the number of vibration marks k is larger than the determination number of vibration marks.

As another alternative modification, attention may be focused on the difference between the current rotation speed of the rotary shaft 3 and the calculated stable rotation speed. When the difference between the current rotation speed of the rotary shaft 3 and the stable rotation speed is small, the chatter vibration will not be effectively suppressed even by changing the rotation speed of the rotary shaft 3 to the stable rotation speed. For this reason, a predetermined rotation speed difference may be held in advance in the determination reference value holding device 15 as a determination rotation speed difference (i.e., determination reference value). The determination device 14 may compare the rotation speed difference between the stable rotation speed calculated by the stable rotation speed calculating device 12 and the current rotation speed (i.e., current value) to the determination rotation speed difference, and determine whether or not the stable rotation speed is adopted. To be more specific, the determination device 14 may adopt the stable rotation speed when the rotation speed difference is equal to or greater than the determination rotation speed difference, but may not adopt the stable rotation speed and instead a warning is displayed when the rotation speed difference is smaller than the determination rotation speed difference.

Figure 6:
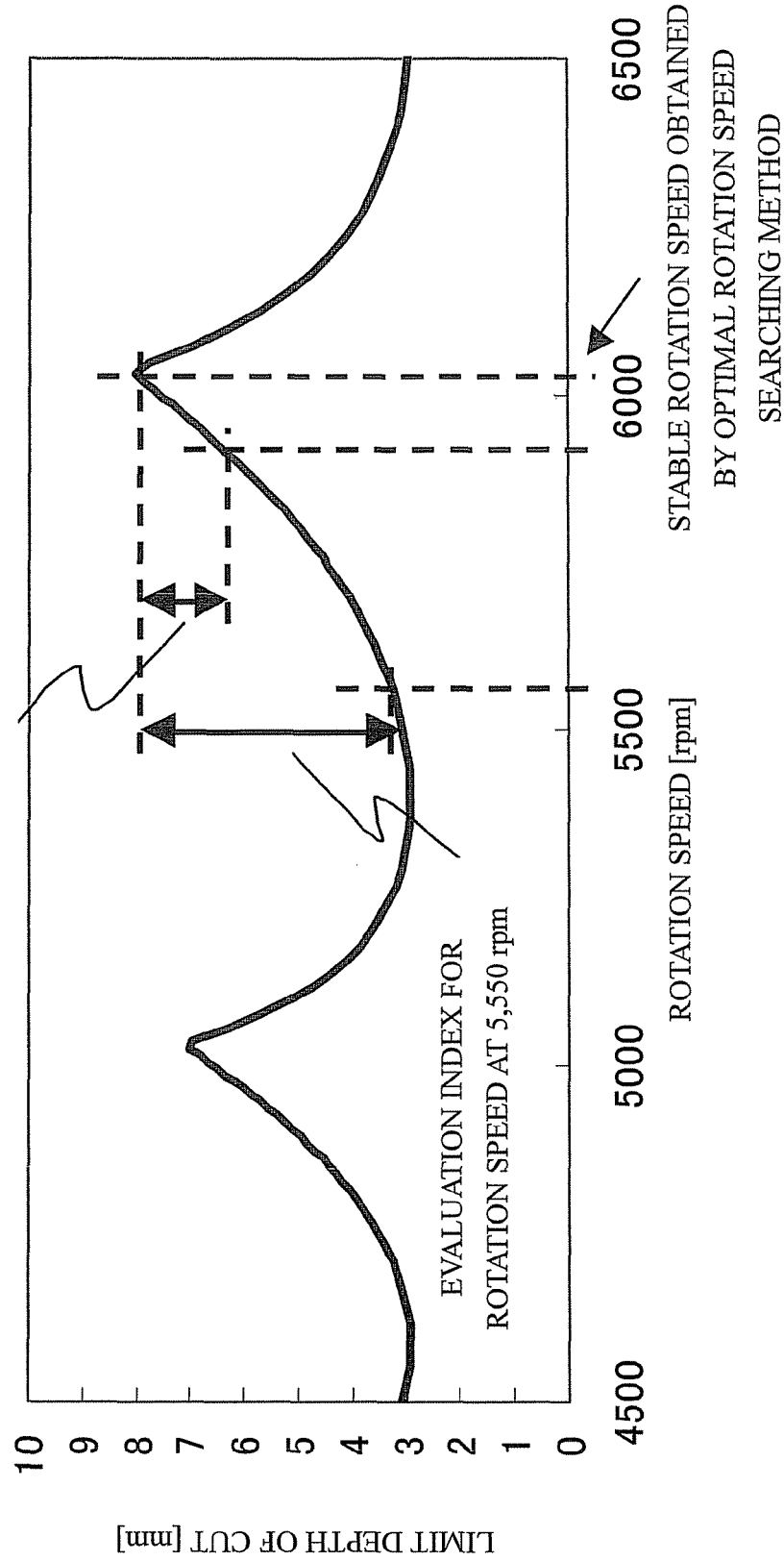
FIG. 6 is an explanatory diagram showing evaluation indices using the stable limit chart.

As a further alternative modification, attention may be focused on a change in the limit depth of cut at the time of changing the rotation speed of the rotary shaft to the stable rotation speed. According to regenerative type "chatter vibration", the magnitude of the chatter vibration generally depends on how much deeper the edge of the tool cuts into the workpiece beyond the limit depth of cut. Therefore, how much chatter vibration can be suppressed by changing the rotation speed to the stable rotation speed depends on how much the limit depth of cut can be improved when compared with the limit depth of cut at the current rotation speed and the limit depth of cut at the stable rotation speed. Accordingly, the difference between the limit depth of cut at the stable rotation speed and the limit depth of cut at the current rotation speed (before change) is regarded as an evaluation index, an example of which is shown in FIG. 6. The depth of cut at the current rotation speed may be obtained from the stable limit chart, but if this value is already known, then the known depth of cut may be adopted. A predetermined evaluation index may be held in advance in the determination reference value holding device 15 as a determination evaluation index (i.e., determination reference value). The determination device 14 may compare the evaluation index obtained based on the stable rotation speed calculated by the stable rotation speed calculating device 12 (i.e., current value) to the determination evaluation index, and determine whether or not the stable rotation speed is adopted. To be more specific, the determination device 14 may adopt the stable rotation speed when the evaluation index is equal to or greater than the determination evaluation index, but may not adopt the stable rotation speed and instead a warning is displayed when the evaluation index is smaller than the determination evaluation index. The stable limit chart may be obtained from a modal parameter in the rotary shaft 3 system with reference to Non-patent Literature 1, or may be obtained in advance by impulsive excitation. As an alternative, the stable limit chart may be prepared at any time during the processing of the workpiece using a known method disclosed in "Inverse identification of a transfer function with experimental results in end milling", 2008 JSPE Spring Meeting. The thus prepared stable limit chart may be held, for example, in the determination reference value holding device 15.

Further, two or more of the aforementioned methods may be combined together upon determination. Namely, the above determination method using the evaluation index is more complex as compared with the other methods, but is highly accurate. For this reason, a first determination step without using the evaluation index may be performed as a simple determination, and thereafter a second determination step using the evaluation index may be performed as a detail determination method. For example, the second determination step may be performed when the determination device 14 determines in the first determination step that the stable rotation speed is not adopted, and when the determination device 14 further determines in the second determination step that the stable rotation speed is not adopted, then a warning may be displayed.

According to the vibration suppressing apparatus 10 for performing vibration suppression control as described above, when the vibration detecting device 11 detects "chatter vibration", the stable rotation speed calculating device 12 calculates a stable rotation speed, and the determination device 14 determines whether or not the chatter vibration is effectively suppressed by the calculated stable rotation speed. In other words, the determination device 14 determines whether or not the stable rotation speed falls in a so-called high speed region. After the determination, the determination device 14 changes the rotation speed of the rotary shaft 3 to the stable rotation speed in accordance with the determination result. It is therefore possible to prevent processing of the workpiece from being continuously carried out at a stable rotation speed which will not be expected to effectively suppress the chatter vibration.

Further, when the determination device 14 determines that the stable rotation speed is ineffective for suppression of the chatter vibration, the rotation speed of the rotary shaft 3 is not changed and the display device 17 displays a warning and informs that the chatter vibration has occurred. Therefore, it is possible to reliably inform the worker of an occurrence of "chatter vibration" so as to urge the worker to take countermeasures such as changing the depth of cut.

Second Embodiment

Figure 7:
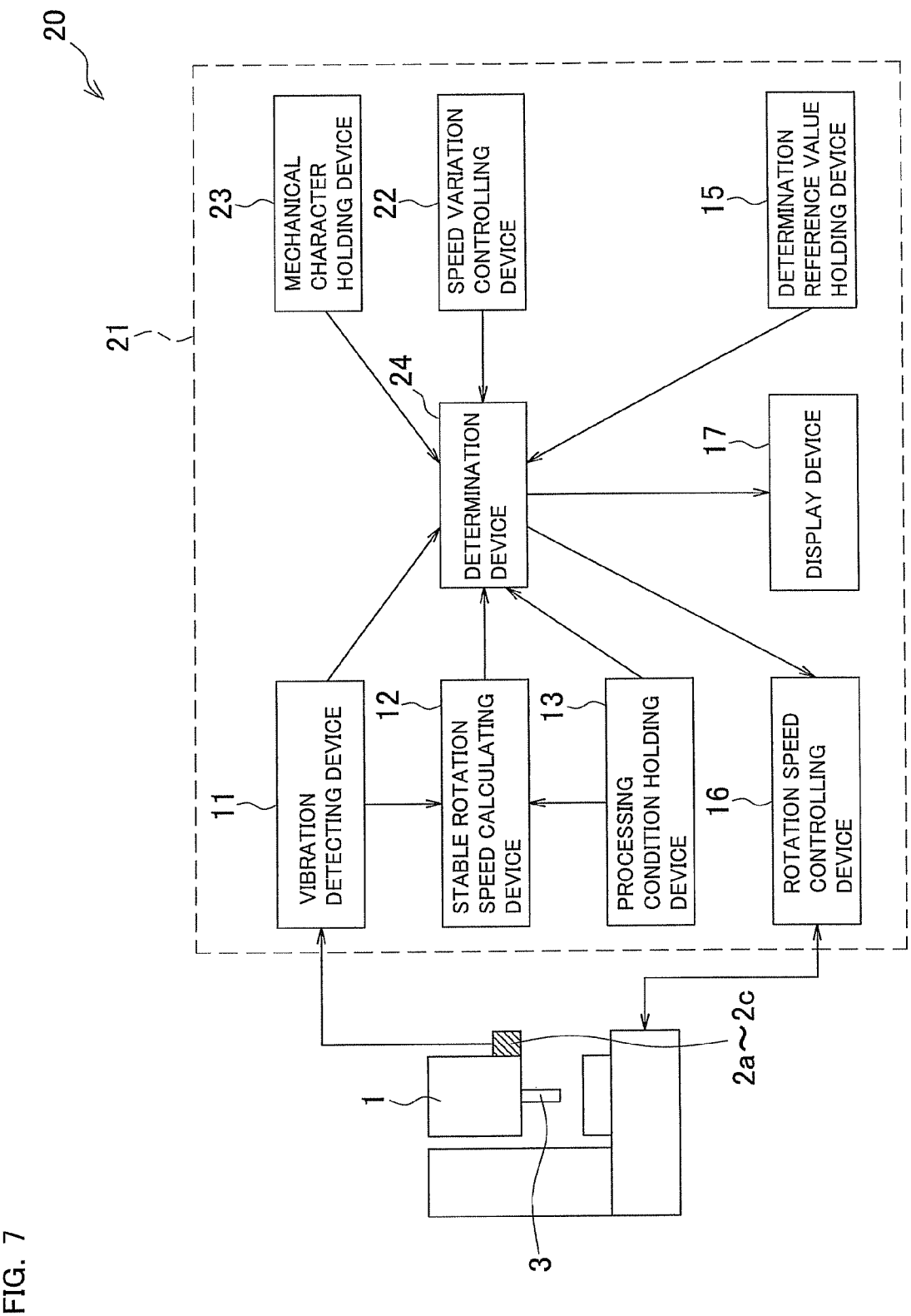
FIG. 7 is a block diagram of a vibration suppressing apparatus according to a second embodiment of the present invention.

FIG. 7 is a block diagram of a vibration suppressing apparatus according to a second embodiment of the present invention. Parts similar to those previously described in the first embodiment are denoted by the same reference numerals, and detailed description thereof will be omitted.

A vibration suppressing apparatus 20 is configured to suppress "chatter vibration" generated in a rotary shaft 3 which is rotatably provided around a C-axis of the rotary shaft housing 1. The vibration suppressing apparatus 20 includes vibration sensors 2a-2c for detecting time-domain vibrational accelerations (which means vibrational accelerations on a time axis) generated at the rotating rotary shaft 3, and a controller 21 for analyzing the detection values of the vibration sensors 2a-2c to determine whether or not "chatter vibration" has occurred and based on the determination result controlling rotation speed of the rotary shaft 3. As with the first embodiment, the vibration sensors 2a-2c are attached to the rotary shaft housing 1.

The controller 21 includes: the vibration detecting device 11, the stable rotation speed calculating device 12, the processing condition holding device 13, the determination reference value holding device 15, the rotation speed controlling device 16, and the display device 17, which are similar to those of the first embodiment, a speed variation controlling device 22, a mechanical character holding device 23, and a determination device 24.

The speed variation controlling device 22 is configured to create a command for fluctuating rotation speed of the rotary shaft 3 using amplitude and period to be input based on an input average rotation speed. The mechanical character holding device 23 is configured to hold correlations between inertia moment and rotation speed of the rotary portion in the rotary shaft housing 1 and rated torque. Further, the determination device 24 is configured to determine whether or not the stable rotation speed calculated by the stable rotation speed calculating device 12 is adopted or the command created by the speed variation controlling device 22 is adopted. The inertia moment of the rotary portion held in the mechanical character holding device 23 indicates inertia moment of the rotor of the rotary shaft 3 and the tool attached to the rotary shaft 3 in the case where the machine tool having the rotary shaft housing 1 is a machining center, but indicates inertia moment of a unit including the rotor, the chuck portion and the workpiece in the case where the machine tool having the rotary shaft housing 1 is a lathe.

Vibration suppression control for "chatter vibration" using the vibration suppressing apparatus 20 is explained below.

A predetermined determination reference value (e.g., determination rotation speed or the like) as described in the first embodiment is held in the determination reference value holding device 15. Thereafter, when the rotary shaft 3 rotates at a predetermined rotation speed and the processing is started under control of the controller 21, the vibration detecting device 11 detects "chatter vibration." When the vibration detecting device 11 detects an occurrence of "chatter vibration", the stable rotation speed calculating device 12 calculates the stable rotation speed. The determination device 24 compares the predetermined detection value and the calculated value to the determination reference value, and determines whether or not the calculated stable rotation speed is adopted. The determination device 24 changes the rotation speed of the rotary shaft 3 to the stable rotation speed through the rotation speed controlling device 16 when the calculated stable rotation speed is adopted.

On the contrary, when the determination device 24 determines that the stable rotation speed is not adopted, the display device 17 urges the worker to input a reference rotation speed that is to be a reference for fluctuating the rotation speed, amplitude of variation, and period of variation (hereinafter collectively referred to as variation parameters). When the worker inputs the reference rotation speed, amplitude, and period, the speed variation controlling device 22 creates a command for fluctuating the rotation speed of the rotary shaft 3 based on the variation parameters and inputs the command to the determination device 24. The determination device 24 then determines whether or not the fluctuation of the rotation speed based on the variation parameters is executable on the basis of information held in the mechanical character holding device 23. In other words, upon executing the fluctuation of the rotation speed based on the variation parameters, a determination is made as to whether or not the required torque of the motor exceeds the maximum motor torque of the rotary shaft 3. When the required torque of the motor does not exceed the maximum motor torque of the rotary shaft 3, the determination device 24 adopts the command created by the speed variation controlling device 22, and through the rotation speed controlling device 16 fluctuates the rotation speed of the rotary shaft 3 based on the input variation parameters. On the contrary, when the required torque of the motor exceeds the maximum motor torque of the rotary shaft 3, the determination device 24 does not adopt the command created by the speed variation controlling device 22 and the display device 17 displays a warning again to inform about the occurrence of the chatter vibration and to urge the worker to re-enter the variation parameters.

According to the second embodiment, the vibration suppression control is executed such that if the stable rotation speed is not adopted, the rotation speed of the rotary shaft 3 is fluctuated based on the input variation parameters. However, the vibration suppression control may be executed such that when the chatter vibration is not suppressed within a predetermined period of time after changing the rotation speed to the stable rotation speed, then the rotation speed of the rotary shaft 3 is fluctuated based on the input variation parameters.

Other than the above, various modifications may be made to the second embodiment.

For example, the speed variation controlling device 22 creates the command in accordance with the worker's input. However, variation parameters such as the reference rotation speed, amplitude, and period may be previously set in the speed variation controlling device 22, so that if the stable rotation speed is not adopted, the speed variation controlling device 22 automatically creates the command.

As another alternative modification, the determination using the determination reference value may not be carried out. To be more specific, the rotation speed of the rotary shaft 3 may be changed to the stable rotation speed after detection of "chatter vibration" for suppressing the chatter vibration, and when the chatter vibration is detected again within a predetermined period of time, for example, after changing the rotation speed to the stable rotation speed, the determination device 24 may determine that the chatter vibration is not effectively suppressed by the stable rotation speed and then fluctuate the rotation speed of the rotary shaft 3 based on the input (or previously set) variation parameters.

On the contrary, the determination device 24 may fluctuate the rotation speed of the rotary shaft 3 based on the input (or previously set) variation parameters after detection of "chatter vibration" for suppressing the chatter vibration, and when the chatter vibration is detected again within a predetermined period of time, for example, after execution of this fluctuation, the determination device 24 may determine that the chatter vibration is not effectively suppressed by the fluctuation of the rotation speed based on the variation parameters and then change the rotation speed of the rotary shaft 3 to the stable rotation speed.

As a further alternative modification of the second embodiment, the determination device 24 may not be configured to change the rotation speed of the rotary shaft 3 to the stable rotation speed. To be more specific, the determination device 24 may compare the predetermined detection value and the calculated value to the determination reference value, and only determine whether or not the rotation speed of the rotary shaft 3 should be fluctuated based on the input (or previously set) variation parameters.

According to the vibration suppressing apparatus 20 for performing vibration suppression control as described above, the determination device 24 selects a vibration suppression control effective to the chatter vibration on the basis of the comparison of the predetermined detection value and the calculated value to the determination reference value or the result of executing the actual vibration suppression control. It is therefore possible to prevent the vibration suppression control that is ineffective against suppression of the chatter vibration from being continuously adopted.

Further, when the rotation speed of the rotary shaft 3 is fluctuated based on the input (or previously set) variation parameters, the determination device 24 determines whether or not such a fluctuation is executable. If the input (or previously set) variation parameters are inexecutable, the display device 17 displays a warning to urge the worker to re-enter the variation parameters. This can prevent the worker from continuously processing the workpiece with an unimproved processing method.

Although the present invention has been described in detail with reference to the above embodiments, the present invention is not limited to these specific embodiments and various changes and modifications may be made without departing from the scope of the appended claims. For example, the vibration detecting device, the controller and/or the vibration suppression control by the controller may be modified where necessary within the scope of the claims.

In the above embodiments, vibrational acceleration of the rotary shaft is detected by the vibration sensor(s). However, the present invention is not limited to this specific configuration. For example, displacement of the rotary shaft or sound pressure due to vibration may be detected, and the optimal rotation speed may be calculated from the displacement or the sound pressure. Alternatively, the vibrational acceleration may be detected from the rotary shaft or electric current value of a feed axis motor for feeding the rotary shaft.

Further, in the above embodiments, detection of chatter vibration is performed based on a waveform showing the maximum value of the frequency-domain vibrational accelerations. However, a plurality of (e.g., three) waveforms which show the highest (i.e., the highest three) values of the frequency-domain vibrational accelerations may be used to further improve the chatter vibration suppression effect.

Further, in the above embodiments, vibration is detected at the rotary shaft of the machine tool. However, vibration may be detected at the non-rotatable side (stationary side) of the machine tool to calculate the optimal rotation speed. Further, other than the machining center for rotating a tool, the present invention may be applicable to other types of machine tools such as a lathe for rotating a workpiece. It is of course to be understood that installation positions of the vibration detecting devices, the number of vibration detecting devices and the like may be changed where necessary in accordance with the kind, size and the like of the machine tool.

What is claimed is:

1. A method for suppressing chatter vibration of a machine tool provided with a rotary shaft for rotating a tool or a workpiece during the rotation of the rotary shaft, the method comprising the steps of:
    a first step of detecting chatter vibration using at least one vibration detecting device;
    a second step of calculating a stable rotation speed for suppressing the chatter vibration using a stable rotation speed calculating device after detection of the chatter vibration; and
    a third step of comparing a detection value detected by the vibration detecting device, a predetermined setting value, and/or a current value that is calculated based on at least one of the detection value and the setting value, to a predetermined determination reference value that is previously set, determining whether or not the stable rotation speed is adopted in accordance with the comparison result, and changing rotation speed of the rotary shaft to the stable rotation speed if the stable rotation speed is adopted, the third step being executed by a determination device.

2. The method according to claim 1, wherein if the stable rotation speed is not adopted in the third step, a display device indicates that chatter vibration has occurred.

3. The method according to claim 1, wherein the determination reference value includes at least one of a predetermined rotation speed, chatter frequency of chatter vibration, a pitch between local maximum values in a stable limit chart, the number of vibration marks left on a cutting surface due to chatter vibration, difference between current rotation speed and the stable rotation speed, and difference between current depth of cut and depth of cut at the stable rotation speed.

4. A method for suppressing chatter vibration of a machine tool provided with a rotary shaft for rotating a tool or a workpiece during the rotation of the rotary shaft, the method comprising the steps of:
    a first step of detecting chatter vibration using at least one vibration detecting device;
    a second step of creating a command for fluctuating rotation speed of the rotary shaft after detection of the chatter vibration using a speed variation controlling device, based on variation parameters including a reference rotation speed that is input or previously set, amplitude and period; and
    a third step of comparing a detection value detected by the vibration detecting device, a predetermined setting value, and/or a current value that is calculated based on at least one of the detection value and the setting value, to a predetermined determination reference value that is previously set, determining whether or not the command is adopted in accordance with the comparison result, and fluctuating rotation speed of the rotary shaft based on the command if the command is adopted, the third step being executed by a determination device.

5. The method according to claim 4, wherein the third step further comprises determining as to whether or not the command is executable on the rotary shaft irrespective of whether the command is adopted, and adopting the command and fluctuating the rotation speed of the rotary shaft based on the command if the command is executable.

6. The method according to claim 5, wherein if the rotation speed of the rotary shaft is not fluctuated based on the command in the third step, a display device indicates that chatter vibration has occurred.

7. The method according to claim 4, wherein if the rotation speed of the rotary shaft is not fluctuated based on the command in the third step, a display device indicates that chatter vibration has occurred.

8. The method according to claim 4, wherein the determination reference value includes at least one of a predetermined rotation speed, chatter frequency of chatter vibration, a pitch between local maximum values in a stable limit chart, the number of vibration marks left on a cutting surface due to chatter vibration, difference between current rotation speed and the stable rotation speed, and difference between current depth of cut and depth of cut at the stable rotation speed.

9. A method for suppressing chatter vibration of a machine tool provided with a rotary shaft for rotating a tool or a workpiece during the rotation of the rotary shaft, the method comprising the steps of:
a first step of detecting chatter vibration using at least one vibration detecting device;
a second step of calculating a stable rotation speed for suppressing the chatter vibration using a stable rotation speed calculating device after detection of the chatter vibration, and creating a command for fluctuating rotation speed of the rotary shaft using a speed variation controlling device based on variation parameters including a reference rotation speed that is input or previously set, amplitude and period; and
a third step of comparing a detection value detected by the vibration detecting device, a predetermined setting value, and/or a current value that is calculated based on at least one of the detection value and the setting value, to a predetermined determination reference value that is previously set, determining whether or not the stable rotation speed is adopted or the command is adopted in accordance with the comparison result, and controlling the rotation speed of the rotary shaft in accordance with the determination result, the third step being executed by a determination device.

10. The method according to claim 9, wherein the third step further comprises determining as to whether or not the command is executable on the rotary shaft irrespective of whether the stable rotation speed is adopted or the command is adopted, and adopting the command and fluctuating the rotation speed of the rotary shaft based on the command if the command is executable.

11. The method according to claim 10, wherein if the command is not executable in the third step, a display device indicates that chatter vibration has occurred.

12. The method according to claim 9, wherein the determination reference value includes at least one of a predetermined rotation speed, chatter frequency of chatter vibration, a pitch between local maximum values in a stable limit chart, the number of vibration marks left on a cutting surface due to chatter vibration, difference between current rotation speed and the stable rotation speed, and difference between current depth of cut and depth of cut at the stable rotation speed.

13. An apparatus for suppressing chatter vibration of a machine tool provided with a rotary shaft for rotating a tool or a workpiece during the rotation of the rotary shaft, the vibration suppressing apparatus comprising:
at least one vibration detecting device each configured to detect chatter vibration;
a stable rotation speed calculating device configured to calculate a stable rotation speed for suppressing the chatter vibration after detection of the chatter vibration; and
a determination device configured to compare a detection value detected by the vibration detecting device, a predetermined setting value, and/or a current value that is calculated based on at least one of the detection value and the setting value, to a predetermined determination reference value that is previously set, to determine whether or not the stable rotation speed is adopted in accordance with the comparison result, and to change rotation speed of the rotary shaft to the stable rotation speed if the stable rotation speed is adopted.

14. The vibration suppressing apparatus according to claim 13, further comprising a display device configured to indicate that chatter vibration has occurred.

15. An apparatus for suppressing chatter vibration of a machine tool provided with a rotary shaft for rotating a tool or a workpiece during the rotation of the rotary shaft, the vibration suppressing apparatus comprising:
at least one vibration detecting device each configured to detect chatter vibration;
a speed variation controlling device configured to create a command for fluctuating rotation speed of the rotary shaft after detection of the chatter vibration, based on variation parameters including a reference rotation speed that is input or previously set, amplitude and period; and
a determination device configured to compare a detection value detected by the vibration detecting device, a predetermined setting value, and/or a current value that is calculated based on at least one of the detection value and the setting value, to a predetermined determination reference value that is previously set, to determine whether or not the command is adopted in accordance with the comparison result, and to fluctuate rotation speed of the rotary shaft based on the command if the command is adopted.

16. The vibration suppressing apparatus according to claim 15, further comprising a display device configured to indicate that chatter vibration has occurred.

17. An apparatus for suppressing chatter vibration of a machine tool provided with a rotary shaft for rotating a tool or a workpiece during the rotation of the rotary shaft, the vibration suppressing apparatus comprising:
at least one vibration detecting device each configured to detect chatter vibration;
a stable rotation speed calculating device configured to calculate a stable rotation speed for suppressing the chatter vibration after detection of the chatter vibration;
a speed variation controlling device configured to create a command for fluctuating rotation speed of the rotary shaft after detection of the chatter vibration, based on variation parameters including a reference rotation speed that is input or previously set, amplitude and period; and
a determination device configured to compare a detection value detected by the vibration detecting device, a predetermined setting value, and/or a current value that is calculated based on at least one of the detection value and the setting value, to a predetermined determination reference value that is previously set, to determine whether or not the stable rotation speed is adopted or the command is adopted in accordance with the comparison result, and to control the rotation speed of the rotary shaft in accordance with the determination result.

18. The vibration suppressing apparatus according to claim 17, further comprising a display device configured to indicate that chatter vibration has occurred.

19. A method for suppressing chatter vibration of a machine tool provided with a rotary shaft for rotating a tool or a workpiece during the rotation of the rotary shaft, the method comprising the steps of:
a first step of detecting chatter vibration using at least one vibration detecting device;
a second step of calculating a stable rotation speed for suppressing the chatter vibration using a stable rotation speed calculating device after detection of the chatter vibration, and creating a command for fluctuating rotation speed of the rotary shaft using a speed variation controlling device based on variation parameters including a reference rotation speed that is input or previously set, amplitude and period; and a third step of selecting and executing one of a first control, by which the rotation speed of the rotary shaft is changed to the stable rotation speed, and a second control, by which the rotation speed of the rotary shaft is fluctuated based on the command, and thereafter executing the other one of the second control and the first control if chatter vibration is detected again in a predetermined period of time, the third step being executed by a determination device.

20. An apparatus for suppressing chatter vibration of a machine tool provided with a rotary shaft for rotating a tool or a workpiece during the rotation of the rotary shaft, the vibration suppressing apparatus comprising:

at least one vibration detecting device each configured to detect chatter vibration;

a stable rotation speed calculating device configured to calculate a stable rotation speed for suppressing the chatter vibration after detection of the chatter vibration;

a speed variation controlling device configured to create a command for changing rotation speed of the rotary shaft after detection of the chatter vibration, based on variation parameters including a reference rotation speed that is input or previously set, amplitude and period; and a determination device configured to select and execute one of a first control, by which the rotation speed of the rotary shaft is changed to the stable rotation speed, and a second control, by which the rotation speed of the rotary shaft is fluctuated based on the command, and thereafter to execute the other one of the second control and the first control if chatter vibration is detected again in a predetermined period of time.

\* \* \* \* \*